(12) United States Patent
Takano et al.

(10) Patent No.: US 6,499,650 B2
(45) Date of Patent: Dec. 31, 2002

(54) SOLDER DROSS REMOVAL APPARATUS AND METHOD

(75) Inventors: Hiroshi Takano, Shah Alam (MY); Hirokazu Ichikawa, Shah Alam (MY)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/945,709

(22) Filed: Sep. 5, 2001

(65) Prior Publication Data

US 2002/0027157 A1 Mar. 7, 2002

(30) Foreign Application Priority Data

Sep. 7, 2000 (JP) ......................................... 2000-271273

(51) Int. Cl.[7] .............................. B23K 3/06; B23K 31/02
(52) U.S. Cl. ........................ 228/219; 228/34; 228/56.1; 228/260
(58) Field of Search ................................ 228/219, 56.1, 228/37, 260, 34

(56) References Cited

U.S. PATENT DOCUMENTS

| | | | | |
|---|---|---|---|---|
| 4,011,980 A | * | 3/1977 | Dvorak et al. | 228/180.1 |
| 4,437,605 A | * | 3/1984 | Tucker et al. | 228/180.1 |
| 4,651,916 A | * | 3/1987 | Ciniglio et al. | 228/180.1 |
| 4,802,617 A | * | 2/1989 | Deambrosio | 228/180.1 |
| 5,038,706 A | * | 8/1991 | Morris | 118/404 |
| 5,087,356 A | * | 2/1992 | Webb | 15/250.17 |
| 5,121,874 A | * | 6/1992 | Deambrosio et al. | 228/219 |
| 5,156,324 A | * | 10/1992 | Hueste et al. | 228/180.1 |
| 5,169,128 A | * | 12/1992 | Zabala et al. | 266/207 |
| 5,297,724 A | * | 3/1994 | Mehta et al. | 228/219 |
| 5,520,320 A | * | 5/1996 | McKean et al. | 228/102 |
| 5,722,581 A | * | 3/1998 | Sindzingre et al. | 134/1.1 |
| 6,214,218 B1 | * | 4/2001 | Kawashima et al. | 134/93 |
| 6,284,190 B1 | * | 9/2001 | van der Lugt et al. | 266/227 |
| 6,352,190 B1 | * | 3/2002 | Lucht et al. | 228/37 |
| 6,378,753 B1 | * | 4/2002 | Schellen et al. | 228/219 |
| 2002/0027157 A1 | * | 3/2002 | Takano et al. | |

* cited by examiner

Primary Examiner—Tom Dunn
Assistant Examiner—Kiley Stoner
(74) Attorney, Agent, or Firm—Wenderoth, Lind & Ponack, L.L.P.

(57) ABSTRACT

An apparatus and method for recovering solder from dross present on the surface of a molten solder includes a solder reservoir for holding a pool of molten solder, and a solder nozzle disposed in the solder reservoir and adapted to direct a solder wave against a printed circuit board to be soldered. The solder nozzle includes opposite side troughs inclined downwardly toward one side of the solder reservoir to direct dross toward a dross zone. A semicircular hood extends across the solder reservoir and is located above the dross zone. A screw extends across the solder reservoir and is covered by the hood. The screw is activated to agitate the dross so as to remove oxides and recover solder from the dross.

22 Claims, 3 Drawing Sheets

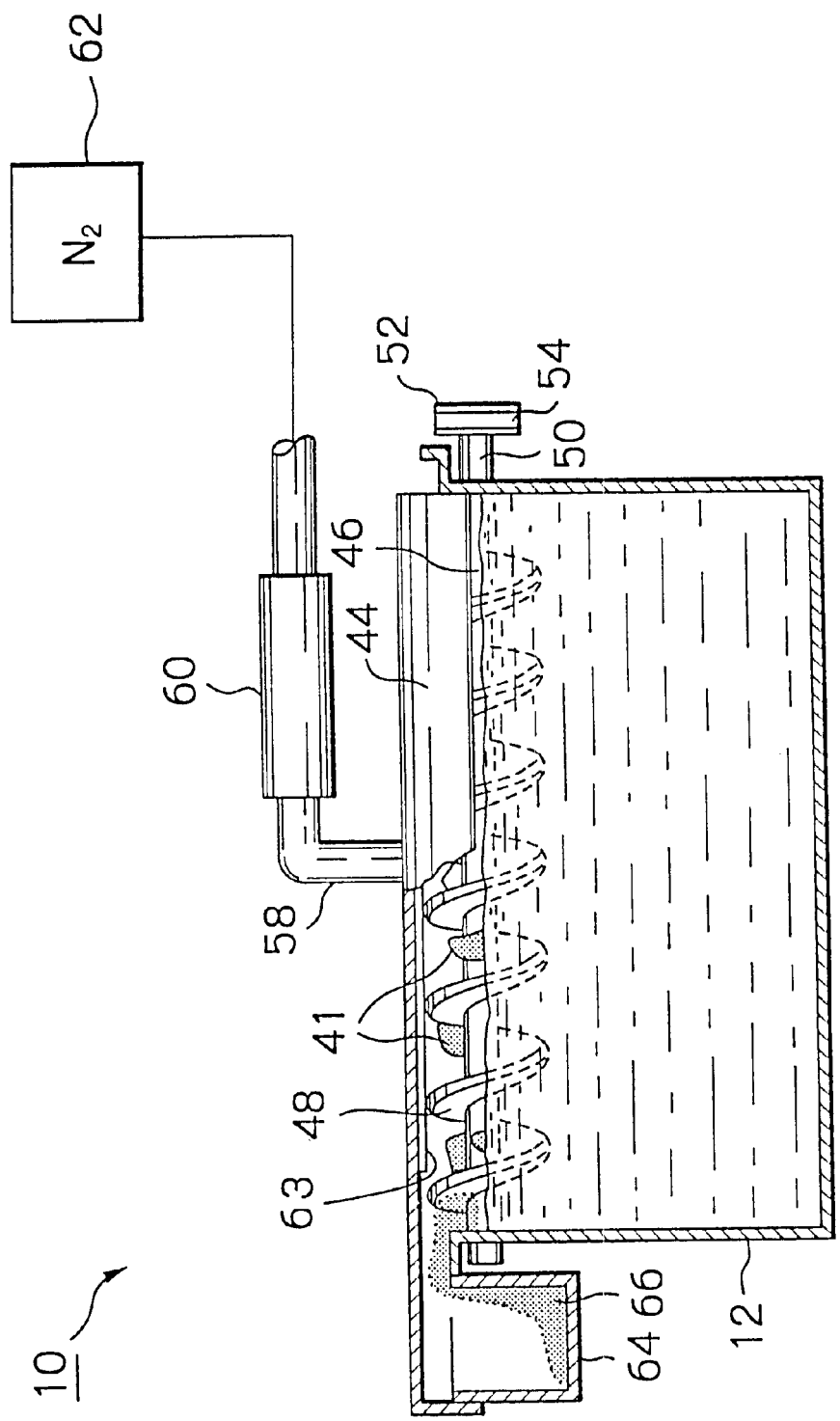

SOLDER DROSS REMOVAL APPARATUS AND METHOD

BACKGROUND OF THE INVENTION

The present invention relates to an improved apparatus and method for recovering solder from dross present on the surface of molten solder where it is exposed to atmospheric air.

In the manufacture of a printed circuit board assembly, there are two commercially important methods of soldering, namely, reflow soldering and wave soldering. The reflow soldering is costly as it employs a solder paste composed of solder particles mixed with flux. In the wave soldering, a wave of solder is caused to well upwardly and contact various portions of a printed circuit board at once. As such, the wave soldering is more economical and provides a higher degree of productivity than the reflow and other processes.

A usual wave soldering machine includes a pair of endless chain conveyors which are driven to advance a printed circuit board at a constant speed from the entrance to exit ends of the machine. While the printed circuit board is held by gripping fingers, the board is first carried to a fluxer where a foam or spray of flux is applied to the underside of the board. The printed circuit board is then carried over preheaters where the temperature of each board is elevated to approximately 110° C. to 130° C. so as to evaporate excess flux solvent, activate the flux and minimize thermal shock to the printed circuit board. After the printed circuit board is brought to such a preheat temperature, the board passes over a solder reservoir to receive solder. The board is finally transported to a cool down zone where the solder is cooled to solidify. The solder reservoir is equipped with heating elements so as to maintain the molten solder at a preset suitable temperature. A relatively narrow solder nozzle is placed in the solder reservoir to produce a turbulent wave. A relatively wide solder nozzle is provided downstream of the narrow solder nozzle to produce a non-turbulent smooth solder wave. A duct extends within the solder reservoir and has one end connected to each of the nozzles. A pump is disposed in the other end of the duct and connected to a motor through a belt-and-pulley assembly. The pump is activated to transmit pressure energy to the molten solder to cause the solder within the duct to lift and form the solder wave. A flow control panel is mounted within each of the nozzles and has a plurality of apertures. The molten solder is caused to flow in a turbulent fashion in the duct due to the pumping action of the solder pump. The apertures of the flow control panel allows uniform flow of the molten solder above the panel within the nozzle.

A problem with such a conventional wave soldering machine is that a quantity of dross forms on the surface of the molten solder where it is exposed to and contacted with atmospheric air. The formation of such dross brings about a change in the height of the solder wave flowing up through the nozzles. When the dross blocks the apertures of the flow control panel, the height of the solder wave becomes low, with the result that at least some of the electronic components in the printed circuit board are left unsoldered. The wave height suddenly becomes higher when the dross is forced away from the apertures due to the continued pumping action of the solder pump. If the wave height is too high, the solder will flow on the top surface of the printed circuit board and ruin the board. Attachment of the dross itself to the printed circuit board causes a short circuit or deteriorates aesthetic appearance of the finished board.

Dross generation also adds considerably to the cost of the wave soldering process due to the lost value of the solder and the maintenance it imposes. It is necessary from time to time to remove dross from the solder reservoir and repair mechanical parts of the machine as damaged by its abrasive action.

Accordingly, it is an object of the present invention to provide an improved apparatus and method for effectively and economically recovering solder from dross formed in a solder reservoir.

SUMMARY OF THE INVENTION

According to one aspect of the present invention, there is provided an apparatus for recovering solder from dross, which comprises a solder reservoir for holding a pool of molten solder. At least one solder nozzle is disposed in the solder reservoir and is adapted to form and direct a solder wave against a substrate to be soldered. The solder nozzle includes opposite side troughs inclined downwardly toward one side of the solder reservoir to direct dross toward a dross zone formed in the first side of the solder reservoir, and a hood is mounted to the solder reservoir and located above the dross zone. An agitator extends across the first side of the solder reservoir and is activated to agitate the dross so as to remove oxides and recover solder from the dross.

The temperature within the dross is much lower than that of the molten solder since the dross present on the surface of the molten solder is exposed to atmospheric air. As such, any solder contained in the dross has a relatively low flowability. To this end, a heating element may be mounted within or outside the hood to heat the interior of the hood to at least 100° C. at which the flowability of the solder becomes higher. This promotes removal of the solder from the dross. Preferably, a source of non-oxidizing gas such as nitrogen may be introduced into the interior of the hood through a gas injector so as to provide a substantially oxygen-free atmosphere. Such an atmosphere not only promotes removal of the oxides from the dross, but also inhibits reoxidization of the solder as reclaimed from the dross. Preferably, a heater may be connected between the source of non-oxidizing gas and the gas injector.

According to another aspect of the present invention, there is provided a method for recovering solder from dross present in a solder reservoir within which a pool of molten solder is held. Dross is directed toward a dross zone defined in one side of the solder reservoir and covered by a hood. The dross is agitated to thereby remove oxides and recover solder from the dross. The solder as reclaimed from the dross is returned to the pool of molten solder. The oxides are delivered out of the solder reservoir.

Preferably, the interior of the hood may be heated to a temperature of at least 100° C. A non-oxidizing gas may preferably be introduced into the interior of the hood to generate a substantially oxygen-free atmosphere within the hood. The none-oxidizing gas may be selected from nitrogen, carbon dioxide, argon and other inert gases, and hydrogen gas and other reactive gases.

The above and other objects, features and advantages of the present invention will be apparent from the following detailed description of the preferred embodiments of the invention, as illustrated in the accompanying drawings.

BRIEF DESCRIPTION OF THE DRAWINGS

FIG. 3 is a sectional view taken along the line III—III of FIG. 1.

DETAILED DESCRIPTION OF THE INVENTION

Figure 1:
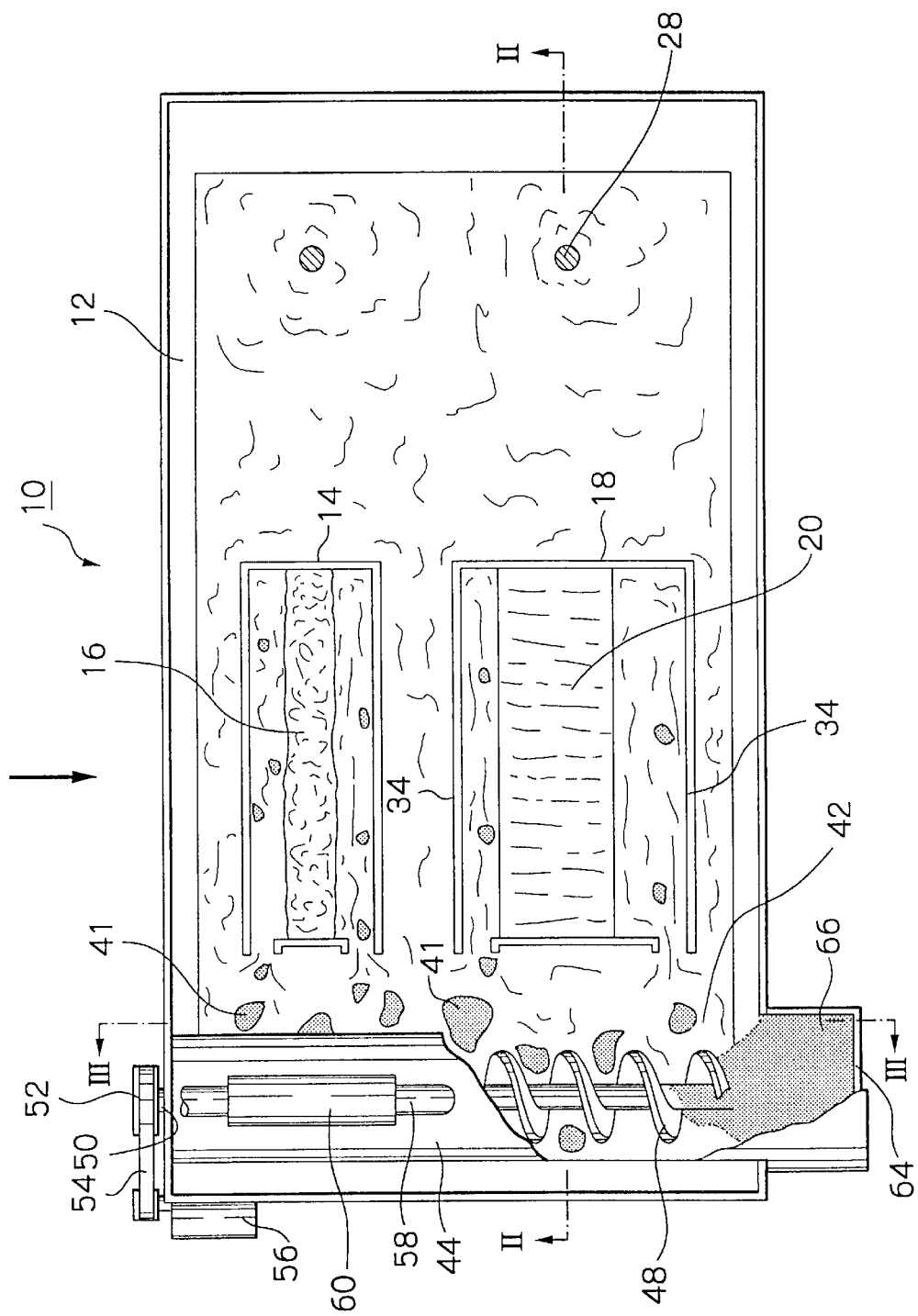
FIG. 1 is a top plan view of a solder dross removal apparatus according to one embodiment of the present invention.
Figure 2:
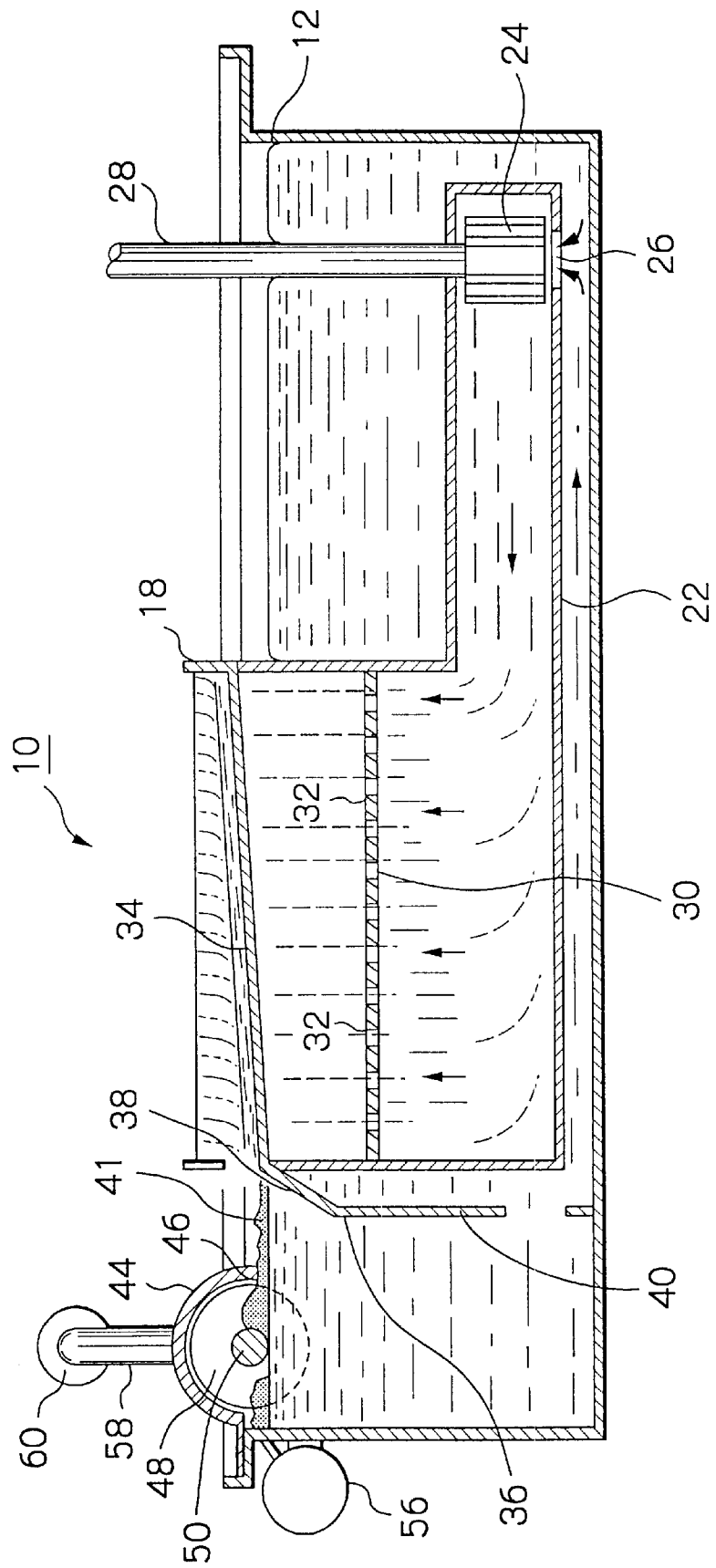
FIG. 2 is a sectional view taken along the line II—II of FIG. 1.

Referring now to FIGS. 1 to 3, there is shown a solder dross removal apparatus assembled according to one embodiment of the present invention and generally indicated by reference numeral 10. The apparatus 10 includes a solder reservoir 12 within which a pool of molten solder is held at a preset suitable temperature by heaters (not shown). A relatively narrow first solder nozzle 14 is vertically disposed in the solder reservoir 12 to produce a turbulent wave 16. The turbulent wave enables the molten solder to fill the gap between leads of electronic components (not shown) and through holes (not shown) in a printed circuit board (not shown). A relatively wide second solder nozzle 18 is vertically disposed downstream of the narrow solder nozzle 14 to produce a smooth laminar flow solder wave 20. The smooth solder wave serves to remove bridges, icicles and other solder deposits which may be formed while the printed circuit board (not shown) passes through the turbulent wave in a direction such as shown in the arrow in FIG. 1. As best shown in FIG. 2, a horizontal duct 22 has one end connected to the lower end of the wide second solder nozzle 18. A solder pump 24 is disposed within the other end of the duct 22. An inlet opening 26 is defined in a portion of the duct 22 below the pump 24. A vertical shaft 28 has one end connected to the pump 24. The other end of the shaft 28 extends above the solder reservoir 12. A pulley (not shown) is secured to the other, free end of the shaft 28. A belt (not shown) extends between the pulley and the output shaft of a motor (not shown). The motor is energized to activate the pump 24 through the belt-and-pulley assembly. This activation allows the molten solder within the solder reservoir 12 to flow into the duct 22 through the inlet opening 26. The molten solder is caused to flow in a turbulent fashion as a result of the continued pumping action of the pump 24. To provide for uniform flow of the molten solder within the nozzle 18, a flow control plate or panel 30 is mounted within the nozzle 18 adjacent to the juncture between the nozzle 18 and the duct 22. The flow control plate 30 is formed with a number of apertures 32. The apertures 32 are arranged so that the molten solder has a substantially straight vertical path above the flow control panel 30 to provide a substantially parallel solder wave.

A pair of elongated side troughs 34 are formed in the longitudinal sides of the wide solder nozzle 18. As best shown in FIG. 2, the side troughs 34 are inclined at an acute angle to the horizontal. A guide plate 36 is attached to each of the downwardly sloping troughs 34. The guide plate 36 has a bent first section 38 extending forwardly and downwardly from the lower end of the trough 34, and a vertical second section 40 connected to the lower end of the first section 38 and terminating a short distance above the bottom of the solder reservoir 12. The guide plates 36 serve to direct the solder and dross 41 toward a dross zone 42 which is located in one side of the solder reservoir 12 opposite the pumps 24. The guide plates 36 also act as barriers to prevent the dross 41 from flowing below or toward the duct 22.

A hood 44 is mounted to and extends across one side of the solder reservoir 12. As shown in FIG. 2, the hood 44 has a substantially semicircular section. The hood 44 has an opening 46 which is open to the nozzle 18 to receive the dross 41. A screw 48 extends across the solder reservoir 12 and is partly submerged in the pool of molten solder. The hood 44 is positioned to surround a part of the screw 48 above the level of the molten solder. As best shown in FIG. 3, the screw 48 has a shaft 50, and a pulley 52 is mounted to one end of the screw shaft 50. A belt 54 extends between the pulley 52 and a motor 56 which is mounted to the solder reservoir 12 adjacent to the pulley 52. A non-oxidizing gas injector 58 in the form of a pipe communicates with the interior of the hood 44. The gas injector 58 is connected through a heater 60 to a source of non-oxidizing gas 62. For example, the non-oxidizing gas can be, but is not limited to, nitrogen. Alternatively, the non-oxidizing gas may be selected from carbon dioxide, argon and other inert gases, and hydrogen gas, ammonolysis gas and other reactive gases. The heater 60 may be, for example, in the form of a tube containing a conventional heating coil (not shown).

Preferably, a heating element 63 is mounted within the hood 44 to raise the temperature within the hood 44. Alternatively, the heating element 63 may be mounted outside of the hood 44. A rectangular dross collection tray 64 is mounted to one side of the solder reservoir 12 opposite the pulley 52 so as to collect oxides 66 removed from the dross 41. Preferably, the hood 44 extends over the dross collection tray 64. This arrangement prevents the oxides in powder form from being scattered over the dross reservoir 12.

It should be understood that the narrow solder nozzle 14 is substantially similar in structure to the wide solder nozzle 18 except that the nozzle opening of the narrow solder nozzle 14 is smaller than that of the wide solder nozzle 18 and will not be described herein.

In use, the pump 24 is activated to draw the liquid solder into the duct 22 through the inlet opening 26. The solder then flows toward the nozzle 18 as shown in FIG. 2. When the solder passes through the apertures 32 in the flow control panel 30, the solder has a substantially straight vertical path. A series of printed circuit boards (not shown) pass over the solder waves 16, 20 established in the nozzles 16, 18, respectively. At this time, the underside of the boards makes contact with the solder waves whereby solder bumps and connections are formed on the printed circuit boards.

When the solder is pumped up through the nozzle 18, the solder falls into the sloping side troughs 34. At this time, the solder is exposed to and contacted with atmospheric air. As a result, dross forms on the top of the molten solder. The dross 41 is directed toward the dross zone 42. The dross 41 is then agitated by the screw 48. As the interior of the hood 44 is heated to a high temperature, the flowability of the solder becomes higher. This promotes removal of oxides and other contaminants from the dross 41. The oxides 66 are delivered to the dross collection tray 64. Any free or reclaimed solder is returned to the solder bath 12. The nitrogen (i.e., non-oxidizing gas), as heated to a temperature of approximately 150° C., is introduced into the hood 44 through the gas injector 58 so as to maintain the interior of the hood 44 under a substantially oxygen-free atmosphere. This not only promotes removal of the oxides from the dross, but also inhibits reoxidization of the reclaimed solder.

The present invention has been described with respect to its preferred embodiment. However, it is to be understood that various modifications and changes may be made without departing from the scope of the invention as defined by the appended claims.

What is claimed is:

1. An apparatus for recovering solder from dross, comprising:

a solder reservoir for accommodating a pool of molten solder;

a solder nozzle for forming and directing a molten solder wave against a substrate to be soldered, said solder nozzle being arranged in said solder reservoir and having a downwardly-inclined trough for channeling dross and excess molten solder from said solder nozzle to a dross zone of said solder reservoir so that the dross collects at said dross zone of said solder reservoir;

an agitator mounted at said dross zone of said solder reservoir so as to be partially submerged in the molten solder accommodated in said solder reservoir, said agitator being arranged downstream of said solder nozzle with respect to a flow of the molten solder, said agitator being operable to agitate the dross collected at said dross zone of said solder reservoir so as to remove oxides from the dross and so as to recover solder from the dross; and a hood mounted to said solder reservoir at said dross zone so as to at least partially cover said agitator.

2. The apparatus of claim 1, wherein said dross zone is located at a side of said solder reservoir.

3. The apparatus of claim 1, wherein said hood is shaped so as to only cover said dross zone of said solder reservoir including said agitator mounted at said dross zone.

4. The apparatus of claim 1, wherein said hood has a substantially semicircular cross-sectional shape.

5. The apparatus of claim 1, wherein said solder reservoir has a bottom and said solder nozzle includes a guide plate, said guide plate including a downwardly-inclined first section connected to said trough and including a vertical second section connected to said first section and extending toward said bottom of said solder reservoir without reaching said bottom.

6. The apparatus of claim 1, further comprising a heating element for heating an interior of said hood to a predetermined temperature.

7. The apparatus of claim 1, further comprising a flow control plate mounted in said solder nozzle, said flow control plate including a plurality of apertures for allowing molten solder to pass therethrough such that the molten solder downstream of said flow control plate flows in a substantially straight vertical path.

8. The apparatus of claim 1, further comprising a non-oxidizing gas source and a gas injector having a first end communicating with said non-oxidizing gas source and having a second end communicating with an interior of said hood.

9. The apparatus of claim 8, further comprising a heater connected between said non-oxidizing gas and said gas injector so as to heat the non-oxidizing gas.

10. The apparatus of claim 1, further comprising a dross collection tray mounted to said solder reservoir adjacent to an end of said agitator for collecting the dross agitated by said agitator.

11. The apparatus of claim 10, wherein said hood covers said dross collection tray.

12. The apparatus of claim 1, wherein said hood has an opening such that an interior of said hood communicates with said solder nozzle.

13. A method of recovering solder from dross produced by a wave soldering apparatus, said method comprising:

channeling excess molten solder discharged from a solder nozzle and dross to a dross zone of a solder reservoir accommodating a pool of molten solder, the dross being produced as a result of the molten solder contacting air after the molten solder is discharged from the solder nozzle;

collecting the dross at the dross zone of the solder reservoir;

agitating the dross at the dross zone of the solder reservoir so as to remove oxides from the dross and so as to recover solder from the dross;

returning the recovered solder to the pool of molten solder; and removing the dross and the oxides from the solder reservoir.

14. The method of claim 13, further comprising:

arranging a hood so as to cover at least a portion of the dross zone; and heating an interior of the hood to a temperature of at least 100° C.

15. The method of claim 13, further comprising:

arranging a hood so as to cover at least a portion of the dross zone; and introducing a non-oxidizing gas into an interior of the hood so as to generate a substantially oxygen-free atmosphere within the hood.

16. The method of claim 15, further comprising heating the non-oxidizing gas before the non-oxidizing gas is introduced into the interior of the hood.

17. The method of claim 15, wherein the non-oxidizing gas comprises an inert gas.

18. The method of claim 17, wherein the inert gas comprises nitrogen.

19. The method of claim 17, wherein the inert gas comprises argon.

20. The method of claim 15, wherein the non-oxidizing gas comprises a reactive.

21. The method of claim 20, wherein the reactive gas comprises hydrogen gas.

22. The method of claim 20, wherein the reactive gas is ammonolysis gas.

* * * * *